United States Patent
Mishra et al.

(10) Patent No.: US 11,509,130 B2
(45) Date of Patent: Nov. 22, 2022

(54) DISCONNECTION ARC PREVENTION IN CABLE-SUPPLIED POWER CONNECTION

(71) Applicant: QUALCOMM INCORPORATED, San Diego, CA (US)

(72) Inventors: Lalan Jee Mishra, San Diego, CA (US); Richard Dominic Wietfeldt, San Diego, CA (US); Georgios Konstantinos Paparrizos, Foster City, CA (US); Joshua Warner, Scottsdale, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 17/172,870

(22) Filed: Feb. 10, 2021

(65) Prior Publication Data

US 2022/0255313 A1    Aug. 11, 2022

(51) Int. Cl.

| H02H 9/00 | (2006.01) |
|---|---|
| G06F 13/20 | (2006.01) |
| G06F 13/40 | (2006.01) |
| H01R 13/66 | (2006.01) |
| H02H 1/00 | (2006.01) |
| H02M 3/08 | (2006.01) |

(52) U.S. Cl.
CPC .............. *H02H 9/005* (2013.01); *G06F 13/20* (2013.01); *G06F 13/4081* (2013.01); *H01R 13/6683* (2013.01); *H02H 1/0007* (2013.01); *H02M 3/08* (2013.01)

(58) Field of Classification Search
CPC ...... H02H 9/005; H02H 1/0007; G06F 13/20; G06F 13/4081; H01R 13/6683; H02M 3/08

USPC ........................................................... 710/15
See application file for complete search history.

(56) References Cited

U.S. PATENT DOCUMENTS

| 1,343,206 | A | * | 6/1920 | Eschholz | ................ | H01F 29/12 |
|---|---|---|---|---|---|---|
| | | | | | | 315/281 |
| 4,454,453 | A | * | 6/1984 | Sugawara | ............. | H01J 37/248 |
| | | | | | | 315/98 |
| 6,176,718 | B1 | * | 1/2001 | Skarie | .................... | H01R 13/64 |
| | | | | | | 439/955 |
| 6,459,998 | B1 | * | 10/2002 | Hoffman | .................. | H02H 5/10 |
| | | | | | | 361/64 |

(Continued)

FOREIGN PATENT DOCUMENTS

| EP | 325882 A1 | 8/1989 |
|---|---|---|
| EP | 3736663 A1 | 11/2020 |

(Continued)

OTHER PUBLICATIONS

Corresponding PCT Application—PCT App Ser. No.—PCT/US2022/011860—(ISA/237) Written Opinion of the International Searching Authority, dated on Jul. 11, 2022.

*Primary Examiner* — Paul R. Myers
(74) *Attorney, Agent, or Firm* — Smith Tempel Blaha LLC/Qualcomm

(57) ABSTRACT

Power delivery may be controlled to help prevent arcing when a data cable supplying power from a power source device to a power sink device is disconnected. The presence of a user in proximity to a connection between a cable plug and a cable receptacle may be detected. The level of a power signal being conveyed from the power source to the power sink may be reduced in response to the detection.

41 Claims, 8 Drawing Sheets

(56) References Cited

U.S. PATENT DOCUMENTS

| | | | |
|---|---|---|---|
| 6,470,800 B1* | 10/2002 | Dunson | B41F 23/04 101/424.1 |
| 7,575,467 B2* | 8/2009 | Ferguson | H01R 13/44 439/489 |
| 8,810,081 B1* | 8/2014 | Flegel | H01R 13/703 307/328 |
| 8,827,513 B2 | 9/2014 | Chen et al. | |
| 9,946,317 B2 | 4/2018 | Backman et al. | |
| 10,423,561 B2 | 9/2019 | So et al. | |
| 2005/0260884 A1* | 11/2005 | Yueh | H01R 13/6691 439/488 |
| 2005/0280964 A1* | 12/2005 | Richmond | H02J 3/14 361/62 |
| 2008/0204220 A1* | 8/2008 | Baird | G08B 25/04 340/533 |
| 2009/0073623 A1* | 3/2009 | Han | H02H 5/12 361/86 |
| 2010/0067153 A1* | 3/2010 | Vellines | H02H 3/334 361/42 |
| 2010/0150573 A1 | 6/2010 | Furuyama | |
| 2011/0122663 A1 | 5/2011 | Huang | |
| 2011/0316355 A1* | 12/2011 | Gruber | H01R 13/641 307/326 |
| 2012/0118865 A1* | 5/2012 | Stava | B23K 9/1006 219/130.31 |
| 2012/0173770 A1 | 7/2012 | Walker et al. | |
| 2013/0280956 A1 | 10/2013 | Cheng et al. | |
| 2014/0042806 A1* | 2/2014 | Gless | B60L 3/0007 307/328 |
| 2014/0106611 A1* | 4/2014 | Hardy | H01R 13/7175 439/577 |
| 2015/0137684 A1* | 5/2015 | Hartman | H05B 47/22 315/120 |
| 2015/0207350 A1* | 7/2015 | Chen | H02J 7/0042 320/111 |
| 2016/0236407 A1* | 8/2016 | Armani | B29C 64/118 |
| 2017/0089589 A1* | 3/2017 | Lamasanu | H05B 1/0258 |
| 2017/0133792 A1 | 5/2017 | Werley et al. | |
| 2017/0162929 A1 | 6/2017 | Goren | |
| 2018/0351376 A1* | 12/2018 | Park | H02H 5/12 |
| 2019/0157858 A1* | 5/2019 | Patel | H02H 5/12 |
| 2021/0305980 A1* | 9/2021 | Sim | H02H 3/087 |

FOREIGN PATENT DOCUMENTS

| | | |
|---|---|---|
| EP | 3493068 B1 | 3/2021 |
| WO | 20185098 A1 | 9/2020 |

\* cited by examiner

DISCONNECTION ARC PREVENTION IN CABLE-SUPPLIED POWER CONNECTION

DESCRIPTION OF THE RELATED ART

Portable computing devices ("PCD"s) are becoming necessities for people on personal and professional levels. These devices may include cellular telephones (e.g., smartphones), tablet computers, palmtop computers, portable digital assistants or "PDA"s, portable game consoles, laptops, and other portable electronic devices. A PCD is generally powered by a rechargeable battery, although power may also be supplied from an external source through a cable.

Universal Serial Bus ("USB") is a data interface that is capable of supplying power along with the data signals. A USB cable is a data cable that is also capable of delivering power to, for example, a PCD. It has become common to charge a battery or otherwise supply power to a PCD by connecting a USB cable between the PCD's USB port and a USB port that supplies power. USB ports that serve as power supply receptacles in this manner have become ubiquitous and are found in diverse environments, including hotel rooms, automobiles, aircraft seating, and other locations where people use PCDs. The system or device supplying power may be referred to as the power "source" device, and the device (e.g., PCD) to which the power is being supplied may be referred to as the power "sink" device. While USB has long had the capability of supplying a limited amount of power along with the data signals, a more recent iteration of USB, known as Type-C ("USB-C") and USB Power Delivery ("USB-PD"), including an enhancement known as Extended Power Range ("EPR"), is capable of supplying substantially greater amounts of power. Higher power delivery may enable faster battery charging, among other advantages.

High voltages on USB connectors may pose risks not only to users but also to the connectors themselves, as arcing between contacts may occur if a high voltage remains during disconnection of the connectors. Such arcing may damage the connector contacts. The present disclosure addresses reducing such risks.

SUMMARY OF THE DISCLOSURE

Systems, methods, and other examples of controlling power supplied through a data cable assembly are disclosed. The systems, methods, and other examples disclosed herein may provide benefits such as, for example, inhibiting arcing when a data cable assembly supplying power from a power source device to a power sink device is disconnected.

An exemplary method for controlling power supplied through a data cable assembly may include detecting the presence of a user in proximity to a connection between a cable plug and a cable receptacle. The exemplary method may further include generating a detection signal in response to detecting the presence of the user. The exemplary method may still further include reducing the level of a power signal being conveyed between the cable plug and the cable receptacle in response to the detection signal.

An exemplary system for controlling power supplied through a data cable assembly may include a cable portion containing one or more data signal paths and power conductors. The exemplary system may also include a cable plug attached to an end of the cable portion. The exemplary system may further include a sensor in the cable plug configured to detect the presence of a user in proximity to the cable plug. The exemplary system may still further include a power delivery controller in the cable plug configured to transmit via the cable plug a power level reduction signal in response to detecting the presence of a user in proximity to the cable plug.

Another exemplary system for controlling power supplied through a data cable assembly may include a power sink cable receptacle, a sensor configured to the detect presence of a user in proximity to the power sink cable receptacle, and a sink power controller. The sink power controller may be configured to transmit, via the power sink cable receptacle, a power level reduction signal in response to detecting the presence of a user in proximity to the power sink cable receptacle.

Still another exemplary system for controlling power supplied through a data cable assembly may include a power source cable receptacle, a sensor configured to detect the presence of a user in proximity to the power source cable receptacle, a power supply, and a source power controller. The source power controller may be configured to reduce the level of a power signal provided by the power supply to the power source cable receptacle in response to detecting the presence of a user in proximity to the power source cable receptacle.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

Figure 1:
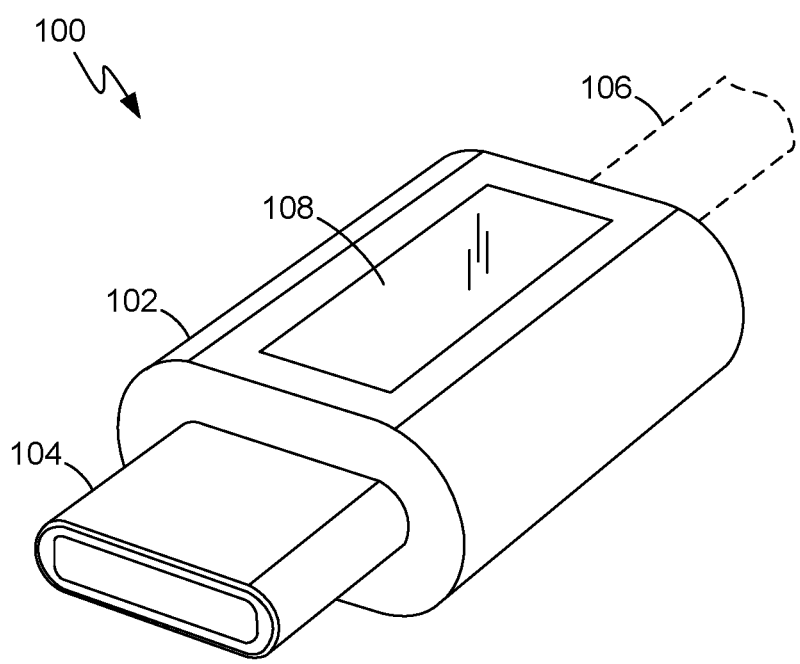
FIG. 1 is a perspective view of a cable plug, in accordance with exemplary embodiments.

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

The term "data cable" may be used herein to refer to a cable configured to carry or communicate one or more data signals. A USB cable is an example of a data cable configured not only to communicate data signals but also to deliver power.

Higher power delivery may be achieved by a combination of higher voltage and higher current. The USB-C specification contemplates power levels reaching, for example, 100 watts ("W") at 20 volts direct current ("VDC") and 5 amperes ("A"). The EPR enhancement to USB-C may allow voltages to reach 50V at 5 A, for example. Such higher voltages on USB-C connectors during the act of disconnecting them may pose an increased risk of arcing, which may damage the connector contacts.

The USB-C specification promotes features to reduce the various risks posed by higher voltages. For example, in accordance with the USB-C specification, the power source device and power sink device may communicate information with each other regarding power delivery. This communication is facilitated by power delivery control circuitry (i.e., an integrated circuit chip) embedded in the USB-C cable plug at one or both ends of the cable. The power delivery control circuitry, also referred to as "E-Marker" circuitry or an E-Marker controller, in effect tags or marks the USB-C cable with its power transmission capability. A USB-C cable having power delivery control circuitry may be referred to as an electronically marked cable ("EMC") or electronically marked cable assembly ("EMCA").

A USB-C port may assume any of several roles, including a downstream-facing port ("DFP"), which is configured to send data in a downstream direction, or an upstream-facing port ("UFP"), which is configured to send data in an upstream direction. A DFP may also source power. An example of a DFP application is a docking station. A UFP may also sink power. Example of UFPs include monitors and solid-state data storage drives. A dual-role port ("DRP") may be configured as a DFP or UFP and may switch roles dynamically.

When a USB-C cable is plugged into a USB-C port of a device, the device may look for E-Marker circuitry in the cable to determine whether the cable is compatible with the USB-C Power Delivery specification and, if so, the cable's maximum current rating. Also, when the two ends of a USB-C cable are plugged into respective USB-C ports of two devices, the two devices may communicate with each other to determine the respective roles of their USB-C ports, i.e., to establish which device is to serve as the power source device and which device is to serve as the power sink device. Then, the power source device and power sink device may further communicate with each other to determine or negotiate the rules or conditions under which power is to be transferred, taking into account the power source device's power delivery capability, the power sink device's requested voltage and current, and the cable's maximum current. When the power source device and power sink device complete this negotiation phase, the power source device may begin to supply power at the negotiated voltage and current levels. Commonly, when the power sink device's battery has completed charging, the power sink device may communicate an indication of this event to the power source device, which may then reduce the power level.

The above-described communications between the power source device and power sink device may be insufficient to protect against arcing due to sudden disconnection of a USB-C connector, whether unintentional or intentional. A sudden unintentional disconnection may result from, for example, a cable being inadvertently yanked from a device. A sudden unintentional disconnection also may result from, for example, a device falling from a height, such as falling off a table on which it was charging.

As illustrated in FIG. 1, in an illustrative or exemplary embodiment, a plug 100 includes a body portion 102 and a contact housing portion 104 that extends forwardly from the body portion 102. Also, although not part of the plug 100, a cable portion 106 may extend rearwardly from the body portion 102. As described below, the plug 100 is configured to convey not only data signals but also power. The plug 100 may, for example, conform to a USB-C or other data communication cable power delivery specification.

The plug 100 may include a sensor surface 108 on a face of the body portion 102. Although not shown for purposes of clarity, the plug 100 may include a similar sensor surface on an opposing face of the body portion 102, so that when a user (not shown) grips or attempts to grip the body portion 102 at least one of the user's fingers contacts or otherwise comes into proximity with at least one of the sensor surfaces 108.

The sensor surface 108 may be a portion of a proximity sensor, the remainder of which may be enclosed within the body portion 102 (and therefore not shown in FIG. 1). The term "proximity sensor" as used in this disclosure includes within its scope of meaning a sensor configured to sense or detect the approach of a portion of a user's body (i.e., within a non-zero distance of the sensor surface 108), as well as a touch sensor configured to sense or detect contact between a portion of the user's body and the sensor surface 108 (i.e., a zero distance). The proximity sensor may be, for example, a capacitive type that is sensitive to changes in capacitance caused by the user's hand coming into close proximity with the sensor surface 108 or touching the sensor surface 108. Alternatively, the proximity sensor may be of a pressure-sensitive type configurable to detect a user's touch. In still other alternative embodiments, the proximity sensor may be of an infrared, photoelectric, etc., type. For example, the sensor surface 108 may include an infrared emitter and detector pair (not shown). Still other types of sensors configurable to detect the presence of a portion of a user's body in proximity to the plug 100 may readily occur to one of ordinary skill in the art in view of the teachings and examples in this disclosure. The proximity sensor may be sensitive to the presence of a user's hand (or similarly detectable object) within, for example, one or two centimeters of the sensor surface 108. The proximity sensor may generate a detection signal when a user's hand comes within such a distance of the sensor surface 108 or touches the sensor surface 108.

The body portion 102 may comprise a skin or "overmold" encasing or otherwise enclosing electrical conductors and electronic components (not shown in FIG. 1), including a portion of the proximity sensor. Although in the illustrated embodiment the sensor surface 108 is exposed, i.e., on or extending to the exterior surface of the overmold, in other embodiments (not shown) such a sensor surface may be embedded beneath the surface of the overmold, depending upon the type of sensor.

Figure 2:
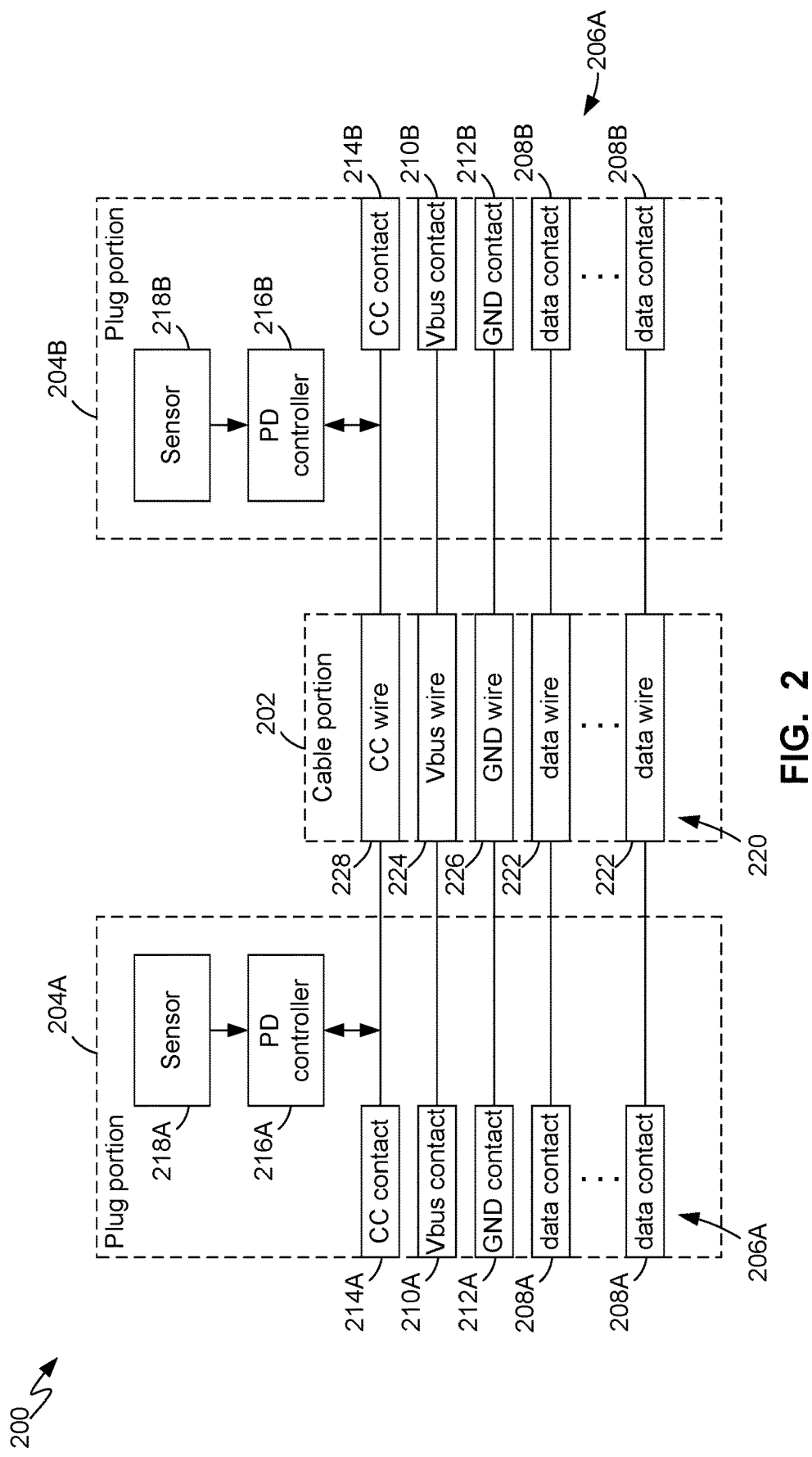
FIG. 2 is a block diagram of a cable configured to convey data and power, in accordance with exemplary embodiments.

As illustrated in block diagram form in FIG. 2, a data cable or cable assembly 200 may include a cable portion 202, a first plug portion 204A at a first end of the cable assembly 200, and a second plug portion 204B at a second end of the cable assembly 200. The term "cable portion" is used herein to refer to the flexible, elongated portion of a data cable assembly that is configured to carry data and power substantially between the ends of the data cable assembly. In the illustrated embodiment, a first end of the cable portion 202 may be coupled to the first plug portion 204A, and a second end of the cable portion 202 may be coupled to the second plug portion 204B. The cable portion 202 thus extends substantially between the first and second plug portions 204A and 204B. (Although mechanical details are not depicted in the block diagram, it may be noted that some insubstantial amounts of the cable portion 202 may be retained within the first and second plug portions 204A and 204B or a strain relief thereof (not shown), as understood by one of ordinary skill in the art.) In other embodiments (not shown), such a cable assembly may include only one plug portion coupled to only one end of the cable portion. In such other embodiments, the other end of such a "captive" cable may be directly connected (i.e., without a readily user-removable connector) to an electronic device, such as a power source device or a power sink device. Either one or both of the plug portions 204A and 204B may have a structure or configuration similar to that of the above-described plug 100 (FIG. 1). For example, either one or both of the plug portions 204A and 204B may have a USB-C structure or configuration.

The first plug portion 204A may include a plurality of electrical contacts 206A. The electrical contacts 206A may include a plurality of data bus contacts 208A. The electrical contacts 206A may also include one or more voltage bus ("Vbus") contacts 210A and one or more ground bus contacts 212A. The electrical contacts 206A may further include one or more control channel ("CC") contacts 214A. Although shown schematically in FIG. 2, the electrical contacts 206A may be arranged and otherwise configured, for example, in a manner that conforms to the USB-C specification, which is well understood by one of ordinary skill in the art.

The first plug portion 204A may also include a power delivery controller 216A and a proximity sensor 218A. The proximity sensor 218A may be of a type described above with regard to FIG. 1, configured to sense the proximity of a user to the first plug portion 204A. An output of the proximity sensor 218A may be coupled to an input of the power delivery controller 216A, so as to provide the detection signal described above with regard to FIG. 1. A bidirectional data port of the power delivery controller 216A may be coupled to the control channel contact 214A. The control channel may be operable in a manner (e.g., with regard to message protocols, etc.) described in the USB-C specification.

The second plug portion 204B may be similar to the first plug portion 204A. The second plug portion 204B may include a plurality of electrical contacts 206B, including data bus contacts 208B, voltage bus contacts 210B, ground bus contacts 212B, and control channel contacts 214B. The second plug portion 204B may include a power delivery controller 216B and a proximity sensor 218B similar to the above-described power delivery controller 216A and proximity sensor 218A.

The cable portion 202 may comprise a plurality of wires 220 enclosed in a flexible cable jacket (not shown). The wires 220 may include a plurality of data bus wires 222. A first end of each data bus wire 222 may be coupled to a respective one of the data bus contacts 208A, and a second end of each data bus wire 222 may be coupled to a respective one of the data bus contacts 208B. In other embodiments (not shown), such a cable portion may include optical fibers for conveying some or all of the data bus signals. The wires 220 may also include one or more voltage bus wires 224. A first end of each voltage bus wire 224 may be coupled to a respective one of the voltage bus contacts 210A, and a second end of each voltage bus wire 224 may be coupled to a respective one of the voltage bus contacts 210B. The wires 220 may further include one or more ground bus wires 226. A first end of each ground bus wire 224 may be coupled to a respective one of the ground bus contacts 212A, and a second end of each voltage bus wire 224 may be coupled to a respective one of the ground bus contacts 212B. The wires 220 may still further include one or more control channel wires 228. A first end of each control channel wire 228 may be coupled to a respective one of the control channel contacts 214A, and a second end of each control channel wire 228 may be coupled to a respective one of the control channel contacts 214B.

Figure 3:
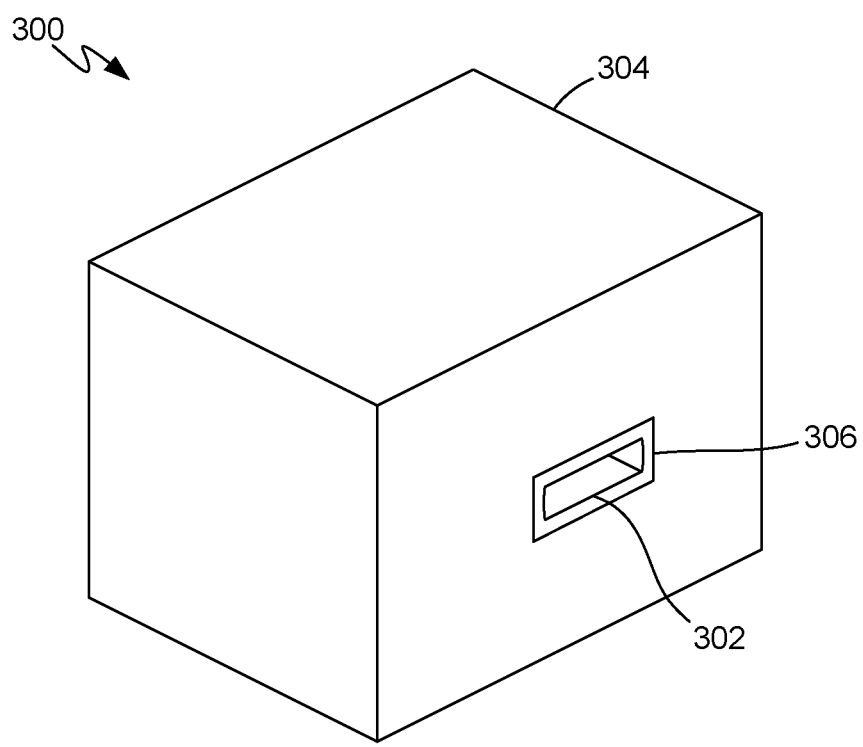
FIG. 3 is a conceptual perspective view of a device having a receptacle, in accordance with exemplary embodiments.

As illustrated in FIG. 3, a device 300 may include a receptacle 302 in a portion of the device housing 304. In the illustrated embodiment, the receptacle 302 is configured to be electrically and mechanically mateable with the above-described plug 100 (FIG. 1) or with the first plug portion 204A or the second plug portion 204B of the above-described cable assembly 200 (FIG. 2). That is, a user may connect the plug 100 to the receptacle 302 (or "plug" the plug 100 into the receptacle 302) and subsequently disconnect or "unplug" the plug 100 from the receptacle. A user may plug either the first plug portion 204A or the second plug portion 204B into the receptacle 302 and subsequently unplug it from the receptacle 302. Aspects of such electrical and mechanical mating may, for example, conform to the USB-C specification. Accordingly, the receptacle 302 may include electrical contacts (not shown) configured to make contact with electrical contacts of the plug 100 (FIG. 1) or with electrical contacts of the first plug portion 204A or second plug portion 204B of the cable assembly 200 (FIG. 2).

The device 300 may be of any type, such as, for example, a portable computing device or PCD. The device 300 may include data processing electronics, such as processors, memories, etc. (not shown). The device 300 may be of a type that is configured to supply power to other devices. A device 300 that is configured to supply power may be referred to as a power source device. In contrast, a device 300 that is configured to receive power may be referred to as a power sink device. In some embodiments, the device 300 may be dynamically configurable as either a power source device or power sink device. An example of a power source device is a charger, which may have a power supply that converts alternating current ("AC") electrical utility power (also known as wall power, mains power, etc.) into lower-voltage DC power.

The device 300 may include a sensor surface 306 on a face of the device housing 304. The sensor surface 306 may be similar to the sensor surface 108 of the above-described plug 100 (FIG. 1) and may be a portion of a proximity sensor (not shown) within the device housing 304. Accordingly, the proximity sensor and its sensor surface 306 are not described in this disclosure in similar detail. The sensor surface 306 may be adjacent to the receptacle 302. The sensor surface 306 may be, for example, in the form of a bezel on a face of the device housing 304 surrounding the receptacle 302. Alternatively, depending upon the sensor type, the sensor surface 306 may be within the device housing 304. The sensor surface 306 may be configured to detect when a user's hand contacts or otherwise comes into proximity with the sensor surface 306. That is, the proximity sensor may generate a detection signal when a user's hand comes within such a distance of the sensor surface 306 or touches the sensor surface 306.

Note that while the above-described plug 100 (FIG. 1) is connected to the cable receptacle 302, the proximity sensor in the plug 100, the proximity sensor in the device 300, or both proximity sensors may sense the presence of a user's hand in proximity to the connection between the plug 100 and cable receptacle 302.

Referring briefly again to FIG. 2, the power delivery controller 216A may be configured to provide the above-described detection signal, or a signal, message, or other indication based on the detection signal, to the control channel contact 214A and, via the control channel wire 228, to the control channel contact 214B. Likewise, the power delivery controller 216B may be configured to provide the above-described detection signal, or a signal, message, or other indication based on the detection signal, to the control channel contact 214B and, via the control channel wire 228, to the control channel contact 214A. Thus, regardless of at which of the plug portions 204A or 204B the presence of a user's hand is detected, the detection signal or indication based on the detection signal may be provided to any device 300 (FIG. 3) connected to either end of the cable assembly 200. For example, an indication of the presence of a user's hand detected at a connection between a power source device and the cable assembly 200 may be conveyed through the cable assembly 200 to a power sink device. Similarly, an indication of the presence of a user's hand detected at a connection between a power sink device and the cable assembly 200 may be conveyed through the cable assembly 200 to a power source device.

At least one of the power delivery controllers 216A and 216B may be configured to operate in a conventional manner in addition to the manner described above with regard to providing the detection signal. For example, one of the power delivery controllers 216A and 216B may be configured to provide information identifying the power delivery capabilities of the cable assembly 200 when queried by a device to which the cable assembly 200 is connected, such as in accordance with the USB-C specification.

Figure 4:
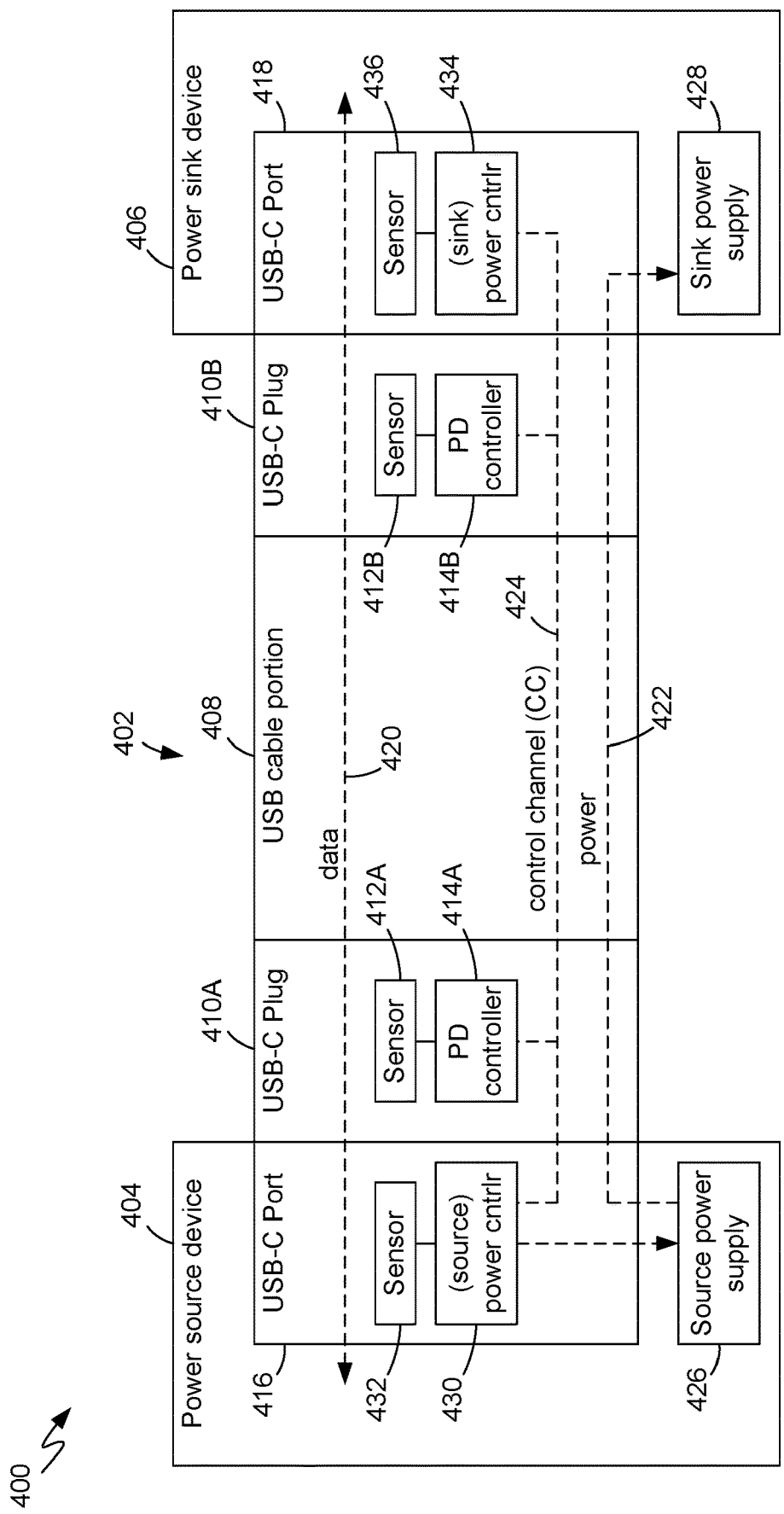
FIG. 4 is a block diagram of a system comprising a power source device and a power sink device interconnected by a data cable, in accordance with exemplary embodiments.

As illustrated in FIG. 4, in a system 400, one end of a cable assembly 402 may be connected to a power source device 404, and the other end of the cable assembly 402 may be connected to a power sink device 406. The cable assembly 402 may have a structure similar to that of the above-described cable assembly 200 (FIG. 2). For example, the cable assembly 402 may include a cable portion 408 attached at one end to a first plug 410A and attached at the other end to a second plug 410B. The first plug 410A may include a proximity sensor 412A and a power delivery controller 414A. The second plug 410B may include a proximity sensor 412B and a power delivery controller 414B.

The power source device 404 may include a port 416. The first plug 410A may be connected to a receptacle (not shown) of the port 416 that is similar to the receptacle 302 of the above-described device 300. Similarly, the power sink device 406 may include a port 418. The second plug 410B may be connected to a receptacle (not shown) of the port 418 that is similar to the receptacle 302 of the above-described device 300. The cable assembly 402 may carry data signals over data bus wires 420, power signals over voltage bus wires 422, and control channel signals over control channel wires 424 (all conceptually indicated in FIG. 4 in broken line). Ground wires in the cable assembly 402 are not shown for purposes of clarity.

The power source device 404 may include a power supply 426. The power supply 426 may have an output coupled to voltage bus contacts (not shown) of the receptacle of the port 416. Power supplied to the port 416 in this manner is thus conveyed via the first plug 410A, the voltage bus wires 422 of the cable assembly 408, and the second plug 410B to the port 418 of the power sink device 406.

The power sink device 406 may similarly include a power supply 428. Voltage bus contacts (not shown) of the receptacle of the port 418 may be coupled to an input of the power supply 428. The power supply 428 may be configured to power electronic components (not shown) of the power sink device 406 using power received from the power source device 404.

The port 416 of the power source device 404 may include a power controller 430 and a sensor 432. The sensor 432 may have a sensor surface (not separately shown) that is similar to the sensor surface 306 of the above-described device 300 (FIG. 3). The power controller 430 and sensor 432 may be configured similarly to the power delivery controller 216A and sensor 218A (FIG. 2) in the respects described above. That is, the power controller 430 may provide a detection signal in response to detection of a user in proximity to the sensor 432. The power controller 430 may provide the detection signal to the cable assembly 402. The power controller 430 may also provide the detection signal to the power supply 426. The power supply 430 may be configured to, in response to the detection signal, reduce the level of the power (e.g., reduce a voltage) being conveyed from the power source device 404 to the power sink device 406. In some embodiments, the power supply 430 may be configured to reduce the level of the power from a first level to a second (non-zero) level. In other embodiments, the power supply 430 may be configured to reduce the level of the power to zero.

The port 418 of the power sink device 406 may include a power controller 434 and a sensor 436 similar to the above-described power controller 430 and sensor 432, respectively. The power controller 434 may provide a detection signal to the cable assembly 402 in response to a detection of a user in proximity to the sensor 436.

Note that a detection signal received by the power controller 430 may be generated by the sensor 432, the sensor 412A, the sensor 412B, or the sensor 436. The power supply 430 may be configured to reduce the level of the power being conveyed from the power source device 404 to the power sink device 406 in response to a detection signal received from any of the sensor 432, the sensor 412A, the sensor 412B, or the sensor 436.

The power controllers 430 and 434 may be configured to operate in a conventional manner in addition to the manner described above with regard to providing the detection signal. For example, the power controllers 430 and 434 may be configured to query one of the power delivery controllers 414A and 414B to determine the power delivery capabilities of the cable assembly 200 and to negotiate a power level, in accordance with the USB-C specification.

Figure 5:
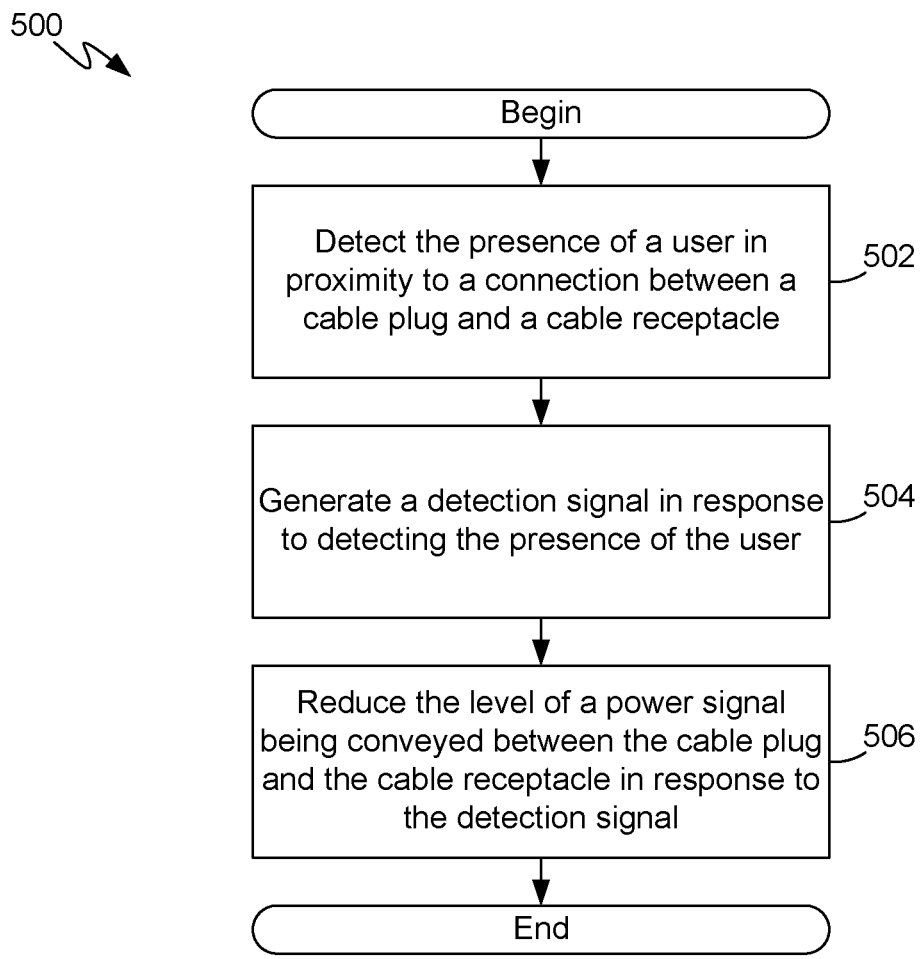
FIG. 5 is a flowchart illustrating a method for controlling power supplied through a data cable from a power source device to a power sink device, in accordance with exemplary embodiments.

In FIG. 5, an exemplary method 500 for controlling power supplied through a cable configured to supply both data and power is illustrated. The method 500 may be performed or controlled in, for example, the above-described system 400 (FIG. 4) or other system. Prior to the beginning of the method 500, the power source device 404 (FIG. 4) may be delivering power to the power sink device 406 via the cable 402. Such power delivery may occur in accordance with a conventional power delivery scheme, such as, for example, provided by the USB-C specification. For example, upon interconnecting the power source device 404 and power sink device 406 using the cable 402, the power source device 404 and power sink device 406 may query one or both of the power delivery controllers 414A and 414B to determine the power delivery capabilities of the cable 402, negotiate a level of power to be delivered, and otherwise begin the power delivery. Upon interconnecting the power source device 404 and power sink device 406 using the cable 402, power delivery may begin at a nominal level, such as, for example, at 5V and 5 A. Then, upon the power source device 404 and power sink device 406 negotiating a higher power level, such as, for example, 20V, or 50V, etc., and, for example, 5 A, the power source device 404 may begin delivering power to the power sink device 406 at the higher level. The method 500 may be performed when the power source device 404 is delivering power to the power sink device 406 at the higher level.

As indicated by block 502, the method 500 may include detecting the presence of a user in proximity to a connection between a cable plug and a cable receptacle. For example, either the sensor 412A or the sensor 432 (FIG. 4) may detect the presence of a user in proximity to the connection between the plug 410A and the port 416 receptacle. Similarly, either the sensor 412B or the sensor 436 may detect the presence of a user in proximity to the connection between the plug 410B and the port 418 receptacle. The presence of a user in proximity to one of these connections may be indicative of impending sudden disconnection. Although not shown in FIG. 5 for purposes of clarity, the presence of a user in proximity to a connection between a cable plug and a cable receptacle may continue to be monitored for, until such time as such presence may be detected (block 502) or power delivery is terminated in another manner (e.g., when charging is completed, or the sink needs no more power from the source to power its system).

As indicated by block 504, the method 500 may also include generating a detection signal in response to detecting the presence of a user. As indicated by block 506, the method 500 may further include reducing a level of a power signal being conveyed between the cable plug and the cable receptacle in response to the detection signal. Thus, the level of the power signal being conveyed from a power source device to a power sink device may be reduced. The level may be reduced, for example, from the above-referenced higher level to the above-referenced nominal level. Alternatively, the level may be reduced to zero. Reducing the level of the power signal may include reducing voltage, reducing current, or reducing both voltage and current.

In an example, the sensor 432 may generate the above-referenced detection signal in response to detecting the presence of a user in proximity to the connection between the plug 410A and the port 416 receptacle. In response to the detection signal, the power controller 430 may then adjust the power supply 426 in a manner that causes the power supply 426 to reduce the level of the power signal being conveyed between the port 416 receptacle and the plug 410A. The reduced power level may inhibit arcing at the connection between the plug 410A and the port 416 receptacle if the user unplugs the plug 410A.

In another example, the sensor 412A may generate the above-referenced detection signal in response to detecting the presence of a user in proximity to the connection between the plug 410A and the port 416 receptacle. The power delivery controller 414A may convey the detection signal, or a signal, message, or other indication based on the detection signal, to the power controller 430 via the control channel. Based on the detection signal, the power controller 430 may then adjust the power supply 426 in a manner that causes the power supply 426 to reduce the level of the power signal being conveyed between the port 416 receptacle and the plug 410A. The reduced power level may inhibit arcing at the connection between the plug 410A and the port 416 receptacle if the user unplugs the plug 410A.

In still another example, the sensor 412B may generate the above-referenced detection signal in response to detecting the presence of a user in proximity to the connection between the plug 410B and the port 418 receptacle. The power delivery controller 414B may convey or transmit the detection signal, or a signal, message, or other indication based on the detection signal, to the power controller 430 over the cable 402 via the control channel. Based on the detection signal, the power controller 430 may then adjust the power supply 426 in a manner that causes the power supply 426 to reduce the level of the power signal being conveyed between the plug 410B and the port 418 receptacle. The reduced power level may inhibit arcing at the connection between the plug 410B and the port 418 receptacle if the user unplugs the plug 410B.

In yet another example, the sensor 436 may generate the above-referenced detection signal in response to detecting the presence of a user in proximity to the connection between the plug 410B and the port 418 receptacle. The power controller 434 may convey or transmit the detection signal, or a signal, message, or other indication based on the detection signal, to the power controller 430 over the cable 402 via the control channel. Based on the detection signal, the power controller 430 may then adjust the power supply 426 in a manner that causes the power supply 426 to reduce the level of the power signal being conveyed between the plug 410B and the port 418 receptacle. The reduced power level may inhibit arcing at the connection between the plug 410B and the port 418 receptacle if the user unplugs the plug 410B.

Although in the above-described examples aspects of the various plugs, receptacles, power delivery schemes, source and sink devices, etc., may conform to aspects of a well-known data cable specification, such as USB-C, it should be understood that USB-C is intended only as an example. In other examples, such aspects of plugs, receptacles, power delivery schemes, source and sink devices, etc., in accordance with the present disclosure may conform to a data cable specification other than USB, or may not conform to any such specification. In view of the examples and other descriptions herein, one of ordinary skill in the art will be capable of applying the inventive subject matter to any type of connector system in which power is delivered via a cable along with data signals.

Figure 6:
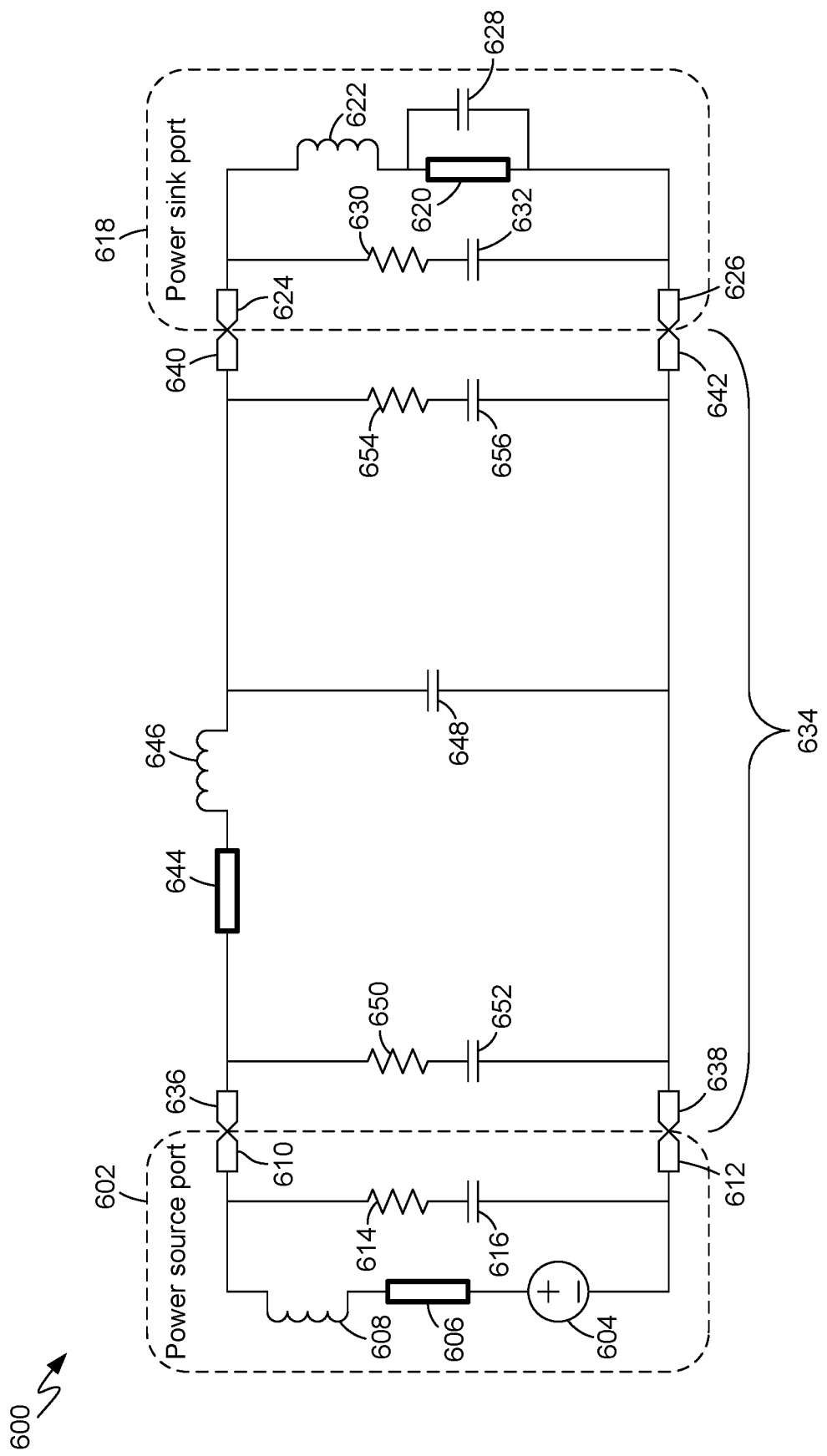
FIG. 6 is a circuit diagram of system having snubber circuitry, in accordance with exemplary embodiments.
Figure 7:
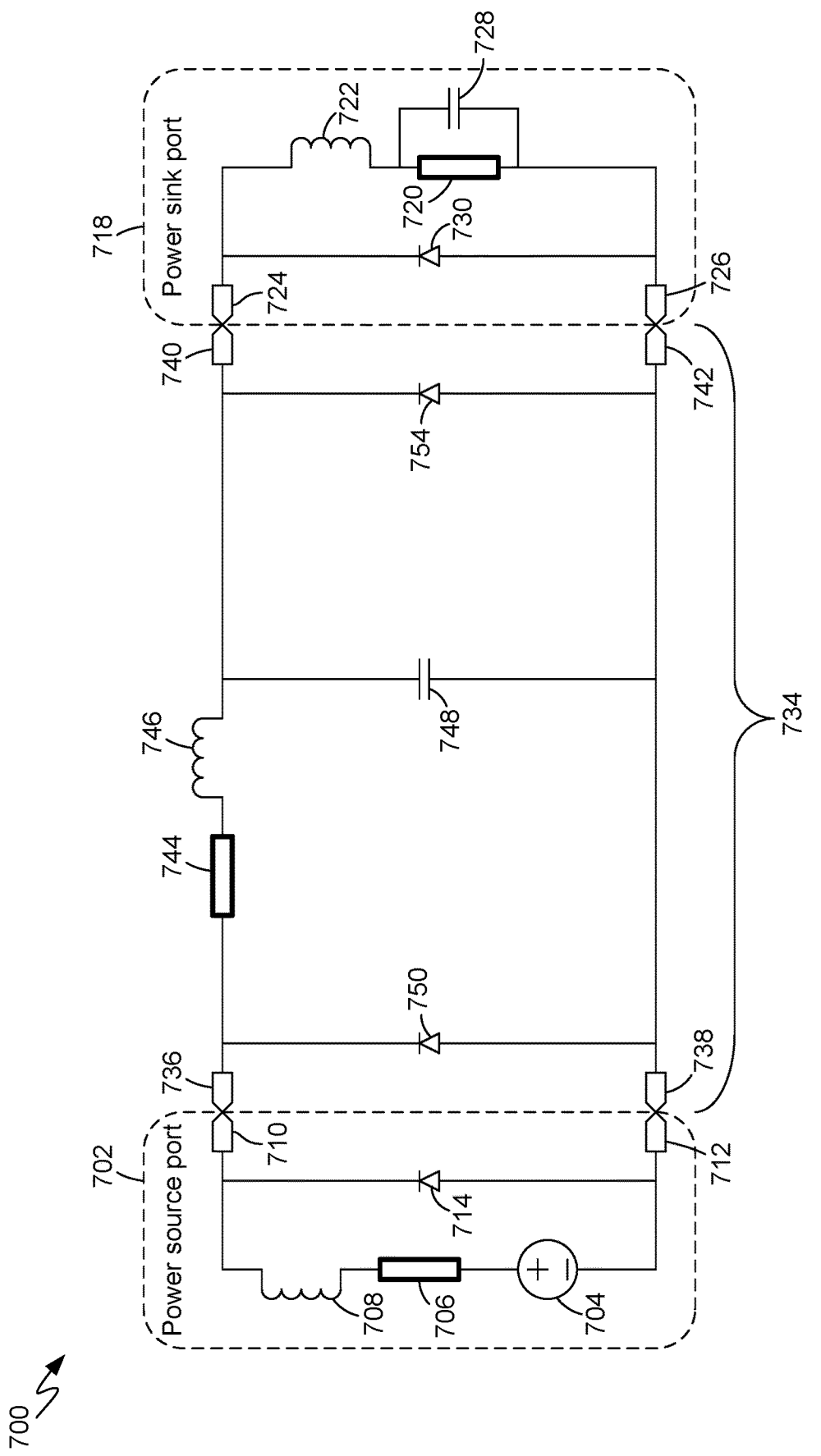
FIG. 7 is a circuit diagram of another system having snubber circuitry, in accordance with exemplary embodiments.

As illustrated in FIGS. 6-7, another technique for inhibiting arcing is to provide a system 600 (FIG. 6), 700 (FIG. 7) or similar system that includes snubber circuitry. A snubber circuit is a type of filter that is configured to absorb the energy (i.e., voltage transient) caused by the circuit inductance when, for example, a power source is abruptly disconnected from a power sink.

The system 600 (FIG. 6) may include one or more of a power source port 602, a power sink port 618, and a cable 634. The ends of the cable 634 may be connected to receptacles (not separately shown for purposes of clarity) of respective ports 602 and 618. The power source port 602 may be an example of a portion of the above-described power source device 404 (FIG. 4). The power sink port 618 may be an example of a portion of the above-described power sink device 406 (FIG. 4). The cable 634 may be an example of a portion of the cable 402 (FIG. 4). Accordingly, aspects of the power source port 602, the power sink port 618, or the cable 634 that are not described below may be similar to aspects described above with regard to power source device 404, the power sink device 406, and the cable 402, respectively. For example, one or more of the power source port 602, the power sink port 618, or the cable 634 may be configured to detect the presence of a user in proximity to a connection between a cable plug and cable receptacle, and to reduce a level of a power signal being conveyed between the plug and receptacle in response to such detection.

The power source port 602 may conceptually comprise (i.e. may be modeled electrically as comprising) a source voltage 604, a source resistance 606, and a source inductance 608 coupled in series with each other between a source voltage bus contact 610 and a source ground contact 612. Source snubber circuitry comprising a resistor 614 in series with a capacitor 616 may be coupled between the source voltage bus contact 610 and the source ground contact 612. Similarly, a power sink port 618 may conceptually comprise a load resistance 620 in series with a load inductance 608, coupled between a sink voltage bus contact 624 and a sink ground contact 626. A load capacitance 628 may be coupled in parallel with the load resistance 620. In addition to the source snubber circuitry, or alternatively to the source snubber circuitry, sink snubber circuitry comprising a resistor 630 in series with a capacitor 632 may be coupled between the sink voltage bus contact 624 and the sink ground contact 626.

In addition to the source and/or sink snubber circuitry, or alternatively to the source and/or sink snubber circuitry, snubber circuitry may be included in the cable 634. The cable 634 may include a first cable voltage bus contact 636 and a first cable ground contact 638 at a first end of the cable 634. The cable 634 may include a second cable voltage bus contact 640 and a second cable ground contact 642 at a second end of the cable 634. The connection between voltage bus contacts 636 and 640 provides the voltage bus, and the connection between the ground contacts 638 and 642 provides the ground bus. The cable 634 may conceptually comprise a cable resistance 644 in series with a cable inductance 646 between the first cable voltage contact 636 and the second cable voltage contact 640. The cable 634 may further conceptually comprise a capacitance 648 between the voltage bus and the ground bus. The cable 634 may include first cable snubber circuitry comprising a resistor 650 in series with a capacitor 652 coupled between the first cable voltage bus contact 636 and the first cable ground contact 638. Alternatively, or in addition to the first cable snubber circuitry, the cable 634 may include second cable snubber circuitry comprising a resistor 654 in series with a capacitor 656 coupled between the second cable voltage bus contact 640 and the second cable ground contact 642.

The system 700 (FIG. 7) may include one or more of a power source port 702, a power sink port 718, and a cable 734. Except as described below with regard to the configuration of the snubber circuitry, the power source port 702, the power sink port 718, and the cable 734 may be similar to the above-described power source port 602, power sink port 618, and cable 634 (FIG. 6).

The power source port 702 may conceptually comprise (i.e. may be modeled electrically as comprising) a source voltage 704, a source resistance 706, and a source inductance 708 coupled in series with each other between a source voltage bus contact 710 and a source ground contact 712. Source snubber circuitry comprising a diode 714 may be coupled between the source voltage bus contact 710 and the source ground contact 712. Similarly, a power sink port 718 may conceptually comprise a load resistance 720 in series with a load inductance 708, coupled between a sink voltage bus contact 724 and a sink ground contact 726. A load capacitance 728 may be coupled in parallel with the load resistance 720. In addition to the source snubber circuitry, or alternatively to the source snubber circuitry, sink snubber circuitry comprising a diode 730 may be coupled between the sink voltage bus contact 724 and the sink ground contact 726.

In addition to the source and/or sink snubber circuitry, or alternatively to the source and/or sink snubber circuitry, snubber circuitry may be included in the cable 734. The cable 734 may include a first cable voltage bus contact 736 and a first cable ground contact 738 at a first end of the cable 734. The cable 734 may include a second cable voltage bus contact 740 and a second cable ground contact 742 at a second end of the cable 734. The connection between voltage bus contacts 736 and 740 provides the voltage bus, and the connection between the ground contacts 738 and 742 provides the ground bus. The cable 734 may conceptually comprise a cable resistance 744 in series with a cable inductance 746 between the first cable voltage contact 736 and the second cable voltage contact 740. The cable 734 may further conceptually comprise a capacitance 748 between the voltage bus and the ground bus. The cable 734 may include first cable snubber circuitry comprising a diode 750 coupled between the first cable voltage bus contact 736 and the first cable ground contact 738. Alternatively, or in addition to the first cable snubber circuitry, the cable 734 may include second cable snubber circuitry comprising a diode 754 coupled between the second cable voltage bus contact 740 and the second cable ground contact 742.

Still other types of snubber circuitry that may be included in a cable, source device, or sink device will occur readily to one of ordinary skill in the art in view of the examples described above with regard to FIGS. 6-7. For example, the snubber circuitry may comprise active snubber circuitry or a combination of active and passive snubber circuitry.

Figure 8:
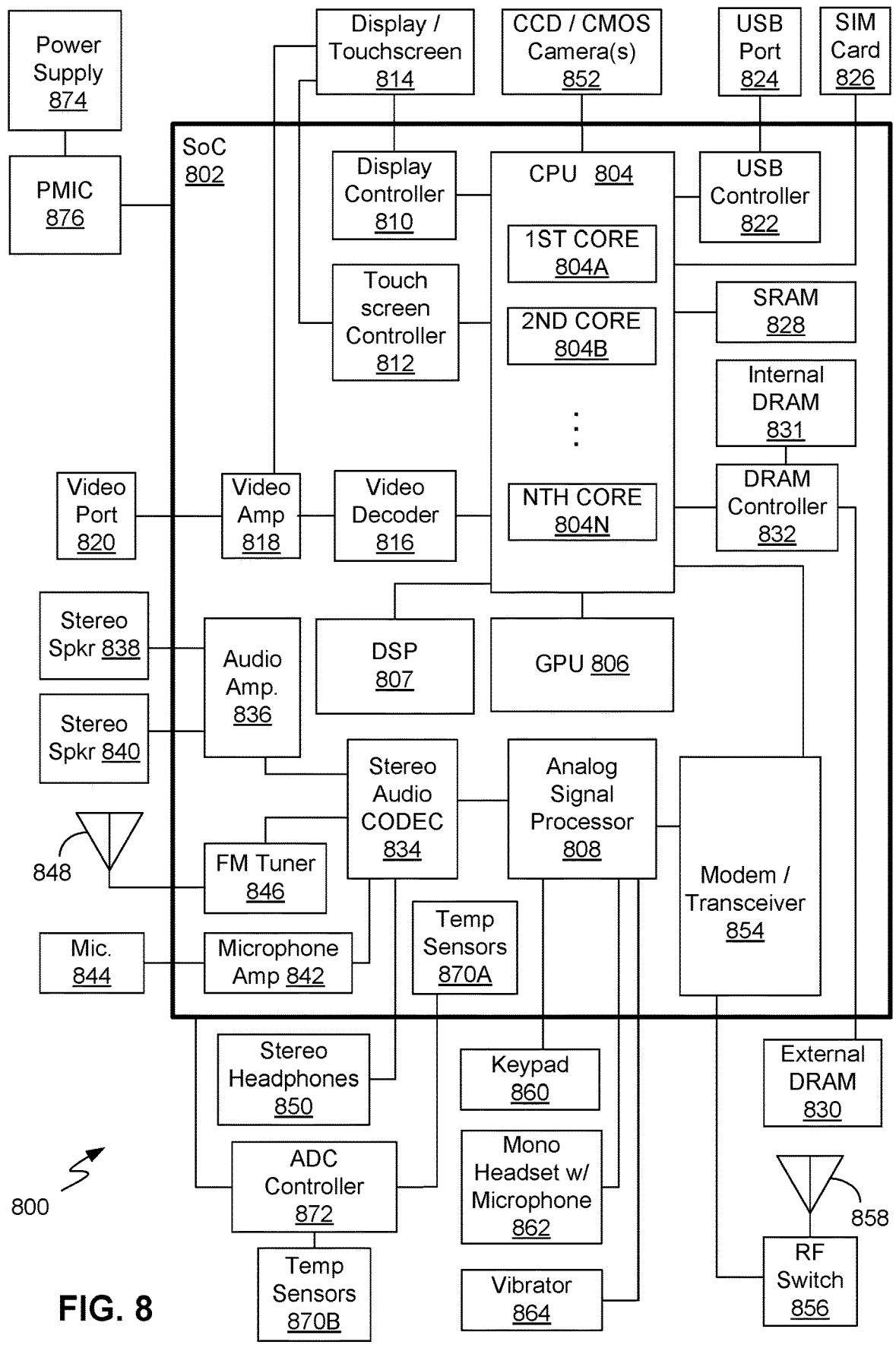
FIG. 8 is a block diagram of a portable computing device configurable as a power source device or power sink device, in accordance with exemplary embodiments.

As illustrated in FIG. 8, a PCD 800 may be an example of a power sink device or a power source device. The PCD 800 may be an example of the above-described device 300 (FIG. 3), power source device 404 (FIG. 4) or power sink device 406 (FIG. 4).

The PCD 800 may include a system-on-a-chip ("SoC") 802. The SoC 802 may include a CPU 804, a GPU 806, a DSP 807, an analog signal processor 808, or other processors. The CPU 804 may include multiple cores, such as a first core 804A, a second core 804B, etc., through an Nth core 804N. In some embodiments, a power controller as described above with regard to FIG. 4 may comprise a functional portion of the CPU 804 or other processor of the PCD 800.

A display controller 810 and a touch-screen controller 812 may be coupled to the CPU 804. A touchscreen display 814 external to the SoC 802 may be coupled to the display controller 810 and the touch-screen controller 812. The PCD 800 may further include a video decoder 816 coupled to the CPU 804. A video amplifier 818 may be coupled to the video decoder 816 and the touchscreen display 814. A video port 820 may be coupled to the video amplifier 818. A subscriber identity module ("SIM") card 826 may also be coupled to the CPU 804. A universal serial bus ("USB") controller 822 may also be coupled to CPU 804, and a USB port 824 may be coupled to the USB controller 822. The USB port 824 may be an example of any of the above-described ports 416, 418 (FIG. 4), etc.

One or more memories may be coupled to the CPU 804. The one or more memories may include both volatile and non-volatile memories. Examples of volatile memories include static random access memory ("SRAM") 828 and dynamic RAMs ("DRAM's) 830 and 831. Such memories may be external to the SoC 802, such as the DRAM 830, or internal to the SoC 802, such as the DRAM 831. A DRAM controller 832 coupled to the CPU 804 may control the writing of data to, and reading of data from, the DRAMs 830 and 831. In other embodiments, such a DRAM controller may be included within a processor, such as the CPU 804.

A stereo audio CODEC 834 may be coupled to the analog signal processor 808. Further, an audio amplifier 836 may be coupled to the stereo audio CODEC 834. First and second stereo speakers 838 and 840, respectively, may be coupled to the audio amplifier 836. In addition, a microphone amplifier 842 may be coupled to the stereo audio CODEC 834, and a microphone 844 may be coupled to the microphone amplifier 842. A frequency modulation ("FM") radio tuner 846 may be coupled to the stereo audio CODEC 834. An FM antenna 848 may be coupled to the FM radio tuner 846. Further, stereo headphones 850 may be coupled to the stereo audio CODEC 834. Other devices that may be coupled to the CPU 804 include one or more digital (e.g., CCD or CMOS) cameras 852.

A modem or RF transceiver 854 may be coupled to the analog signal processor 808. An RF switch 856 may be coupled to the RF transceiver 854 and an RF antenna 858. In addition, a keypad 860, a mono headset with a microphone 862, and a vibrator device 864 may be coupled to the analog signal processor 808.

The SoC 802 may have one or more internal or on-chip thermal sensors 870A and may be coupled to one or more external or off-chip thermal sensors 870B. An analog-to-digital converter ("ADC") controller 872 may convert voltage drops produced by the thermal sensors 870A and 870B to digital signals.

A power supply 874 may be coupled to a power management integrated circuit ("PMIC") 876. The power supply 874 may be an example of any of the above-described power supplies 426, 428 (FIG. 4), etc. Although not indicated in FIG. 8 for purposes of clarity, a control input of the power supply 874 may be coupled to a power controller (not separately shown) of the USB port 824. In other embodiments, the USB controller 822 may include such a power controller.

Firmware or software may be stored in any of the above-described memories, such as DRAM 830 or 831, SRAM 828, etc., or may be stored in a local memory directly accessible by the processor hardware on which the software or firmware executes. Execution of such firmware or software may control aspects of any of the above-described methods (e.g., method 500 of FIG. 5) or configure aspects any of the above-described systems. Any such memory having firmware or software stored therein in computer-readable form for execution by processor hardware may be an example of a "computer-readable medium," as the term is understood in the patent lexicon.

Alternative embodiments will become apparent to one of ordinary skill in the art to which the invention pertains. Therefore, although selected aspects have been illustrated and described in detail, it will be understood that various substitutions and alterations may be made therein.

Implementation examples are described in the following numbered clauses:

1. A method for controlling power supplied through a data cable assembly having a cable portion and a cable plug, comprising:

detecting presence of a user in proximity to a connection between the cable plug and a cable receptacle;

generating a detection signal in response to detecting the presence; and reducing a level of a power signal being conveyed between the cable plug and the cable receptacle in response to the detection signal.

2. The method of clause 1, wherein the cable plug and cable receptacle are configured for Universal Serial Bus (USB) power delivery.

3. The method of clause 1, wherein reducing the level of the power signal comprises reducing the level of the power signal from a first level to a second non-zero level.

4. The method of clause 1, wherein detecting the presence of the user comprises detecting the presence of the user in proximity to the connection at a power source device.

5. The method of clause 1, further comprising transmitting the detection signal over the cable portion and the cable plug.

6. The method of clause 5, wherein:

detecting the presence of the user comprises detecting the presence of the user in proximity to the connection at a power sink device; and transmitting the detection signal comprises transmitting the detection signal to a power source device over the cable portion.

7. The method of clause 1, wherein detecting the presence of the user comprises detecting a touch of the user.

8. The method of clause 7, wherein detecting the touch of the user comprises detecting the touch of the user on a portion of the cable plug.

9. The method of clause 7, wherein detecting the touch of the user comprises detecting the touch of the user on a portion of the cable receptacle.

10. The method of clause 1, wherein detecting the presence of the user comprises detecting a non-zero proximity of the user.

11. The method of clause 10, wherein detecting the non-zero proximity of the user comprises detecting the non-zero proximity of the user to a portion of the cable plug.

12. The method of clause 10, wherein detecting the non-zero proximity of the user comprises detecting the non-zero proximity of the user to a portion of the cable receptacle.

13. The method of clause 1, further comprising filtering the power signal using snubber circuitry in at least one of: the cable plug, a power source device providing the power signal, and a power sink device receiving the power signal.

14. The method of clause 13, wherein the snubber circuitry comprises a capacitor and a resistor in series with each other.

15. The method of clause 13, wherein the snubber circuitry comprises a diode.

16. A system for power control in a data cable assembly, comprising:

a cable portion containing one or more data signal paths and at least one power conductor;

a cable plug attached to an end of the cable portion;

a sensor in the cable plug configured to detect presence of a user in proximity to the cable plug; and a power delivery controller in the cable plug configured to transmit via the cable plug a power level reduction signal in response to detecting the presence of a user in proximity to the cable plug.

17. The system of clause 16, wherein the cable plug is configured for Universal Serial Bus (USB) power delivery.

18. The system of clause 16, wherein the sensor is a touch sensor.

19. The system of clause 16, wherein the sensor is a non-zero proximity sensor.

20. The system of clause 16, further comprising snubber circuitry coupled to a power conductor of the cable portion.

21. The method of clause 20, wherein the snubber circuitry comprises a capacitor and a resistor in series with each other.

22. The method of clause 20, wherein the snubber circuitry comprises a diode.

23. The system of clause 16, further comprising:
a power source cable receptacle mateable with the cable plug;
a power supply; and
a source power controller configured to receive the power level reduction signal and to reduce a level of a power signal provided by the power supply to the power source cable receptacle in response to the power level reduction signal.

24. The system of clause 23, wherein the source power controller is configured to reduce the level of the power signal from a first level to a second non-zero level.

25. A system for cable-supplied power control in a power sink device, comprising:
a power sink cable receptacle;
a sensor configured to detect presence of a user in proximity to the power sink cable receptacle; and
a sink power controller configured to transmit via the power sink cable receptacle a power level reduction signal in response to detecting the presence of a user in proximity to the power sink cable receptacle.

26. The system of clause 25, wherein the power sink cable receptacle is configured for Universal Serial Bus (USB) power delivery.

27. The system of clause 25, wherein the sensor is a touch sensor.

28. The system of clause 25, wherein the sensor is a non-zero proximity sensor.

29. The system of clause 25, further comprising snubber circuitry coupled to a power conductor of the power sink cable receptacle.

30. The system of clause 29, wherein the snubber circuitry comprises a capacitor and a resistor in series with each other.

31. The system of clause 29, wherein the snubber circuitry comprises a diode.

32. The system of clause 25, further comprising
a power source cable receptacle mateable with a cable;
a power supply; and
a source power controller configured to receive the power level reduction signal via the cable and the power source cable receptacle and to reduce a level of a power signal provided by the power supply to the power source cable receptacle in response to the power level reduction signal.

33. The system of clause 32, wherein the source power controller is configured to reduce the level of the power signal from a first level to a second non-zero level.

34. A system for cable-supplied power control in a power source device, comprising:
a power source cable receptacle;
a sensor configured to detect presence of a user in proximity to the power source cable receptacle;
a power supply; and
a source power controller configured to reduce a level of a power signal provided by the power supply to the power source cable receptacle in response to detecting the presence of a user in proximity to the power source cable receptacle.

35. The system of clause 34, wherein the power source cable receptacle is configured for Universal Serial Bus (USB) power delivery.

36. The system of clause 34, wherein the sensor is a touch sensor.

37. The system of clause 34, wherein the sensor is a non-zero proximity sensor.

38. The system of clause 34, further comprising snubber circuitry coupled to a power conductor of the power sink cable receptacle.

39. The system of clause 38, wherein the snubber circuitry comprises a capacitor and a resistor in series with each other.

40. The system of clause 38, wherein the snubber circuitry comprises a diode.

41. The system of clause 34, wherein the source power controller is configured to reduce the level of the power signal from a first level to a second non-zero level.

What is claimed is:

1. A method for controlling power of a data cable assembly, comprising:
a sensor detecting presence of a user in proximity to a connection between a cable plug and a cable receptacle, the cable plug and sensor being part of the data cable assembly, the data cable assembly further comprising a cable portion coupled to the plug, the sensor being housed within the cable plug;
generating a detection signal by the sensor in response to detecting the presence; and
reducing a level of a power signal being conveyed between the cable plug and the cable receptacle in response to the detection signal.

2. The method of claim 1, wherein the cable plug and cable receptacle are configured for Universal Serial Bus (USB) power delivery.

3. The method of claim 1, wherein reducing the level of the power signal comprises reducing the level of the power signal from a first level to a second non-zero level.

4. The method of claim 1, wherein detecting the presence of the user comprises detecting the presence of the user in proximity to the connection at a power source device.

5. The method of claim 1, further comprising transmitting the detection signal over the cable portion and the cable plug.

6. The method of claim 5, wherein:
detecting the presence of the user comprises detecting the presence of the user in proximity to the connection at a power sink device; and
transmitting the detection signal comprises transmitting the detection signal to a power source device over the cable portion.

7. The method of claim 1, wherein detecting the presence of the user comprises detecting a touch of the user.

8. The method of claim 7, wherein detecting the touch of the user comprises detecting the touch of the user on a portion of the cable plug.

9. The method of claim 7, wherein detecting the touch of the user comprises detecting the touch of the user on a portion of the cable receptacle.

10. The method of claim 1, wherein detecting the presence of the user comprises detecting a non-zero proximity of the user.

11. The method of claim 10, wherein detecting the non-zero proximity of the user comprises detecting the non-zero proximity of the user to a portion of the cable plug.

12. The method of claim 10, wherein detecting the non-zero proximity of the user comprises detecting the non-zero proximity of the user to a portion of the cable receptacle.

13. The method of claim 1, further comprising filtering the power signal using snubber circuitry in at least one of: the cable plug, a power source device providing the power signal, and a power sink device receiving the power signal.

14. The method of claim 13, wherein the snubber circuitry comprises a capacitor and a resistor in series with each other.

15. The method of claim 13, wherein the snubber circuitry comprises a diode.

16. A system for power control in a data cable assembly, comprising:
   a cable containing one or more data signal paths and at least one power conductor;
   a cable plug attached to an end of the cable, the cable and cable plug forming the data cable assembly;
   a sensor housed in the cable plug configured to detect presence of a user in proximity to the cable plug; and
   a power delivery controller housed in the cable plug configured to transmit via the cable plug a power level reduction signal in response to detecting the presence of a user in proximity to the cable plug.

17. The system of claim 16, wherein the cable plug is configured for Universal Serial Bus (USB) power delivery.

18. The system of claim 16, wherein the sensor is a touch sensor.

19. The system of claim 16, wherein the sensor is a non-zero proximity sensor.

20. The system of claim 16, further comprising snubber circuitry coupled to a power conductor of the cable portion.

21. The system of claim 20, wherein the snubber circuitry comprises a capacitor and a resistor in series with each other.

22. The system of claim 20, wherein the snubber circuitry comprises a diode.

23. The system of claim 16, further comprising:
   a power source cable receptacle mateable with the cable plug;
   a power supply; and
   a source power controller configured to receive the power level reduction signal and to reduce a level of a power signal provided by the power supply to the power source cable receptacle in response to the power level reduction signal.

24. The system of claim 23, wherein the source power controller is configured to reduce the level of the power signal from a first level to a second non-zero level.

25. A system for cable-supplied power control in a power sink device, comprising:
   a power sink cable receptacle having a data port and control channel port;
   a sensor housed within the cable receptacle configured to detect presence of a user in proximity to the power sink cable receptacle; and
   a sink power controller coupled to the control channel port and housed within the power sink device configured to transmit via the control channel port of the power sink cable receptacle a power level reduction signal in response to the sensor detecting the presence of a user in proximity to the power sink cable receptacle.

26. The system of claim 25, wherein the power sink cable receptacle is configured for Universal Serial Bus (USB) power delivery.

27. The system of claim 25, wherein the sensor is a touch sensor.

28. The system of claim 25, wherein the sensor is a non-zero proximity sensor.

29. The system of claim 25, further comprising snubber circuitry coupled to a power conductor of the power sink cable receptacle.

30. The system of claim 29, wherein the snubber circuitry comprises a capacitor and a resistor in series with each other.

31. The system of claim 29, wherein the snubber circuitry comprises a diode.

32. The system of claim 25, further comprising a power source cable receptacle mateable with a cable;
   a power supply; and
   a source power controller configured to receive the power level reduction signal via the cable and the power source cable receptacle and to reduce a level of a power signal provided by the power supply to the power source cable receptacle in response to the power level reduction signal.

33. The system of claim 32, wherein the source power controller is configured to reduce the level of the power signal from a first level to a second non-zero level.

34. A system for cable-supplied power control in a power source device, comprising:
   a power source cable receptacle having a data port and control channel port;
   a sensor housed within the cable receptacle configured to detect presence of a user in proximity to the power source cable receptacle;
   a power supply; and
   a source power controller coupled to the control channel port and housed within the power source device configured to reduce a level of a power signal provided by the power supply to the power source cable receptacle in response to the sensor detecting the presence of a user in proximity to the power source cable receptacle.

35. The system of claim 34, wherein the power source cable receptacle is configured for Universal Serial Bus (USB) power delivery.

36. The system of claim 34, wherein the sensor is a touch sensor.

37. The system of claim 34, wherein the sensor is a non-zero proximity sensor.

38. The system of claim 34, further comprising snubber circuitry coupled to a power conductor of the power sink cable receptacle.

39. The system of claim 38, wherein the snubber circuitry comprises a capacitor and a resistor in series with each other.

40. The system of claim 38, wherein the snubber circuitry comprises a diode.

41. The system of claim 34, wherein the source power controller is configured to reduce the level of the power signal from a first level to a second non-zero level.

* * * * *